United States Patent
Yamamura

(10) Patent No.: US 11,525,508 B2
(45) Date of Patent: Dec. 13, 2022

(54) SHIFT DEVICE

(71) Applicant: KABUSHIKI KAISHA TOKAI-RIKA-DENKI-SEISAKUSHO, Aichi (JP)

(72) Inventor: Norihiro Yamamura, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/467,262

(22) PCT Filed: Dec. 6, 2017

(86) PCT No.: PCT/JP2017/043859
§ 371 (c)(1),
(2) Date: Jun. 6, 2019

(87) PCT Pub. No.: WO2018/123486
PCT Pub. Date: Jul. 5, 2018

(65) Prior Publication Data
US 2020/0079213 A1 Mar. 12, 2020

(30) Foreign Application Priority Data
Dec. 26, 2016 (JP) .............................. JP2016-251698

(51) Int. Cl.
*F16H 59/02* (2006.01)
*B60K 20/02* (2006.01)

(52) U.S. Cl.
CPC ......... *F16H 59/0278* (2013.01); *B60K 20/02* (2013.01); *F16H 2059/026* (2013.01); *F16H 2059/0291* (2013.01)

(58) Field of Classification Search
CPC .............. B60K 20/02; F16H 2059/026; F16H 2059/0291; F16H 59/0278; F16H 59/105
See application file for complete search history.

(56) References Cited

U.S. PATENT DOCUMENTS

| | | | |
|---|---|---|---|
| 6,273,466 B1 * | 8/2001 | Suzuki | B60K 20/02 280/748 |
| 6,286,385 B1 * | 9/2001 | Nishimura | F16H 59/10 180/271 |
| 6,526,842 B1 | 3/2003 | Tanaka et al. | |

(Continued)

FOREIGN PATENT DOCUMENTS

| | | |
|---|---|---|
| JP | H10-059007 A | 3/1998 |
| JP | 2000-289484 A | 10/2000 |

(Continued)

*Primary Examiner* — Joseph Brown
(74) *Attorney, Agent, or Firm* — Thomas W. Cole; Calderon Safran & Cole P.C.

(57) ABSTRACT

In a shift device (10), a base portion (42) of a collar (40) is accommodated in a mounting hole (50) of a support portion (34), and a thin plate portion (52) of the support portion (34) is disposed at an upper side of an upper face (42A) of the base portion (42). When an impact load of at least a predetermined value is applied to a shift lever, the thin plate portion (52) of the support portion (34) is broken by the base portion (42) and the support portion (34) moves while being guided by the base portion (42). Thus, the impact load is absorbed. Consequently, an impact load absorption mode may be made consistent.

11 Claims, 6 Drawing Sheets

(56) References Cited

U.S. PATENT DOCUMENTS

| | | | | |
|---|---|---|---|---|
| 6,568,295 | B2* | 5/2003 | Matsuno | F16H 59/0208 74/473.3 |
| 7,854,179 | B2* | 12/2010 | Shimizu | F16H 59/02 74/473.1 |
| 2001/0037700 | A1* | 11/2001 | Nishimura | F16H 59/10 74/473.3 |
| 2009/0056490 | A1* | 3/2009 | Shimizu | F16H 59/02 74/469 |
| 2014/0238172 | A1* | 8/2014 | Nakanishi | B60R 21/0286 74/473.3 |
| 2015/0101448 | A1* | 4/2015 | Nakanishi | F16H 59/10 74/522.5 |

FOREIGN PATENT DOCUMENTS

| | | |
|---|---|---|
| JP | 2006-290214 A | 10/2006 |
| JP | 2014-091334 A | 5/2014 |

* cited by examiner

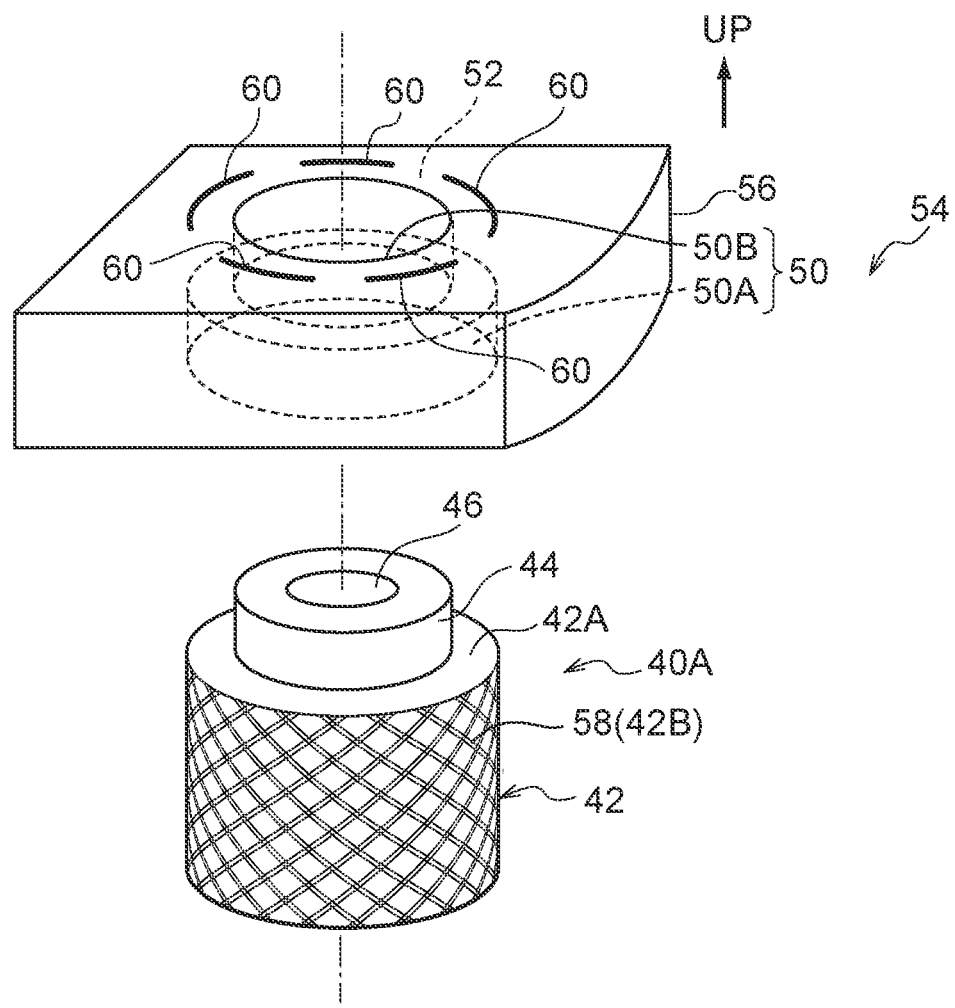

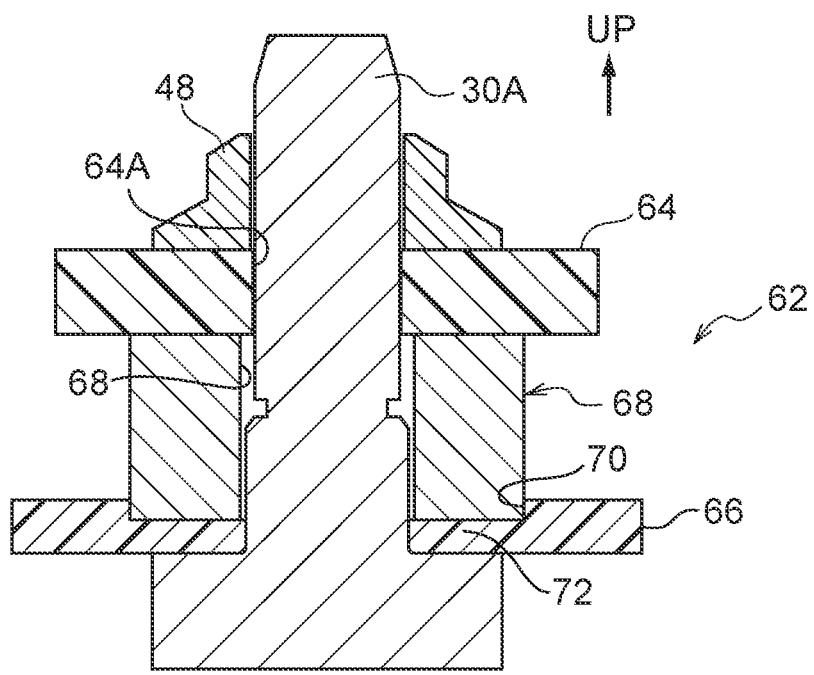

SHIFT DEVICE

CROSS-REFERENCE TO RELATED APPLICATIONS

The present application is a U.S. National Phase of PCT/JP2017/043859 filed on Dec. 6, 2017, claiming priority under 35 USC 119 from Japanese Patent Application No. 2016-251698 filed Dec. 26, 2016. The disclosure of which is incorporated by reference herein.

TECHNICAL FIELD

The present invention relates to a shift device in which a shift body is moved and a shift position is changed.

BACKGROUND ART

In a transmission control device for a vehicle recited in Japanese Patent Application Laid-Open (JP-A) No. 2000-289484, a control lever is supported by a transmission control device main body, and the transmission control device main body is supported by a mounting bracket. A plate-shaped portion of the mounting bracket is inserted into an L-shaped member of the transmission control device main body. When an impact load is applied to the transmission control device main body and moves the transmission control device main body, the L-shaped member is broken by a projecting portion (abutting portion) of the mounting bracket, which absorbs the impact load.

In this transmission control device for a vehicle, it is preferable if an impact load absorption mode by the L-shaped member and mounting bracket can be made consistent.

SUMMARY OF INVENTION

Technical Problem

The present invention has been devised in consideration of the circumstances described above and an object of the present invention is to provide a shift device that may make an impact load absorption mode by an intermediate member and a support portion consistent.

Solution to Problem

A shift device according to a first aspect of the present disclosure includes: a shift body that is movably supported at a support body, a shift position being changed by the shift body being moved; a support portion provided at the support body, an accommodating cavity being provided in the support portion; and an intermediate member accommodated at the accommodating cavity, the support portion being disposed at one side of the intermediate member and, when an impact load is applied to the support body the support portion being broken by a peripheral edge of the intermediate member, the intermediate member intruding into the accommodating cavity, and the impact load being absorbed.

In the shift device according to the first aspect of the present disclosure, the shift body is movably supported by the support body, and the shift position is changed by the shift body being moved. The accommodating cavity is provided in the support portion of the support body, the intermediate member is accommodated in the accommodating cavity, and the support portion is disposed at one side of the intermediate member.

When an impact load is applied to the support body, the support portion is broken by the peripheral edge of the intermediate member and the intermediate member intrudes into the accommodating cavity, absorbing the impact load. Therefore, an impact load absorption mode by the intermediate member and support portion may be made consistent.

In a shift device according to a second aspect of the present disclosure, the shift device according to the first aspect further includes a thin plate portion at the support portion, the thin plate portion being provided at the one side of the intermediate member, and the thin plate portion being thinner in thickness than the support portion at surroundings of the intermediate member.

In the shift device according to the second aspect of the present disclosure, the thin plate portion is provided at the support portion at the one side of the intermediate member, and the thin plate portion has a thinner thickness than the support portion surrounding the intermediate member. Consequently, when an impact load is applied to the support body, the thin plate portion of the support portion is broken consistently by the peripheral edge of the intermediate member. Therefore, the impact load absorption mode by the intermediate member and support portion may be made consistent effectively.

In a shift device according to a third aspect of the present disclosure, the shift device according to the first aspect or the second aspect further includes a friction portion that increases friction force between an outer periphery surface of the intermediate member and an inner periphery surface of the accommodating cavity.

In the shift device according to the third aspect of the present disclosure, the friction portion increases friction force between the outer periphery surface of the intermediate member and the inner periphery surface of the accommodating cavity of the support portion. Therefore, an impact load absorption amount may be increased.

In a shift device according to a fourth aspect of the present disclosure, in the shift device according to any of the first to third aspects, the support portion includes a breakage facilitating portion provided along the peripheral edge of the intermediate member.

In the shift device according to the fourth aspect of the present disclosure, the breakage facilitating portion is provided at the support portion along the peripheral edge of the intermediate member. Consequently, when an impact load is applied to the support body, the support portion is broken consistently by the peripheral edge of the intermediate member. Therefore, the impact load absorption mode by the intermediate member and support portion may be made consistent effectively.

Advantageous Effects of Invention

According to the shift device of the first aspect of the present disclosure, an effect is provided in that an impact load absorption mode by the intermediate member and support portion may be made consistent.

According to the shift device of the second aspect of the present disclosure, an effect is provided in that the impact load absorption mode by the intermediate member and support portion may be made consistent effectively. According to the shift device of the third aspect of the present disclosure, an effect is provided in that an impact load absorption amount may be increased. According to the shift device of the fourth aspect of the present disclosure, an effect is provided in that the impact load absorption mode by the intermediate member and support portion may be made consistent effectively.

BRIEF DESCRIPTION OF DRAWINGS

FIG. 4 is a perspective view depicting a mounting portion and support portion according to a second exemplary embodiment.

FIG. 5 is a sectional diagram, similar to FIG. 3A, of principal portions according to a third exemplary embodiment.

DETAILED DESCRIPTION

First Exemplary Embodiment

Figure 1:
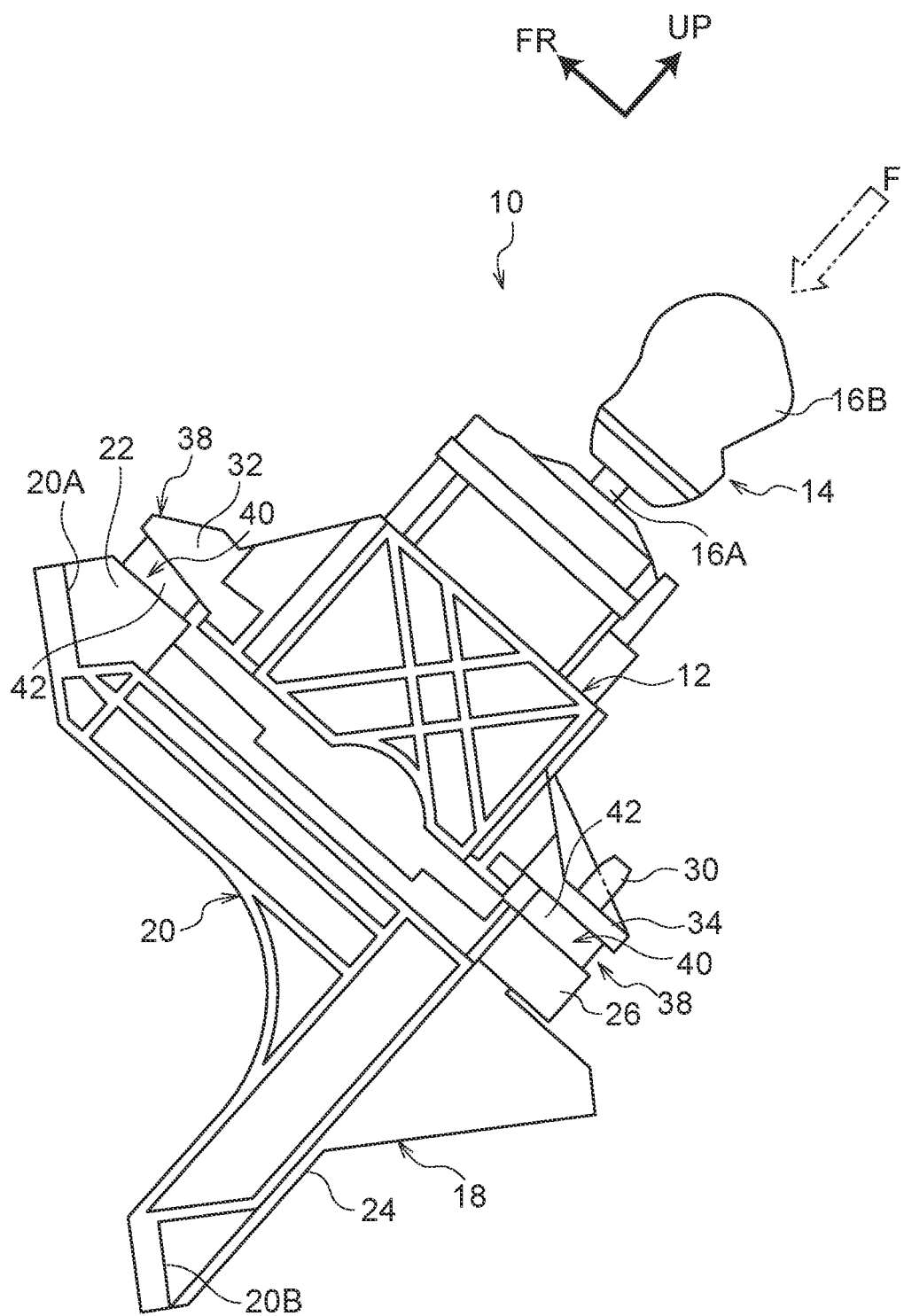
FIG. 1 is a side view depicting principal portions of a shift device according to a first exemplary embodiment.
Figure 2:
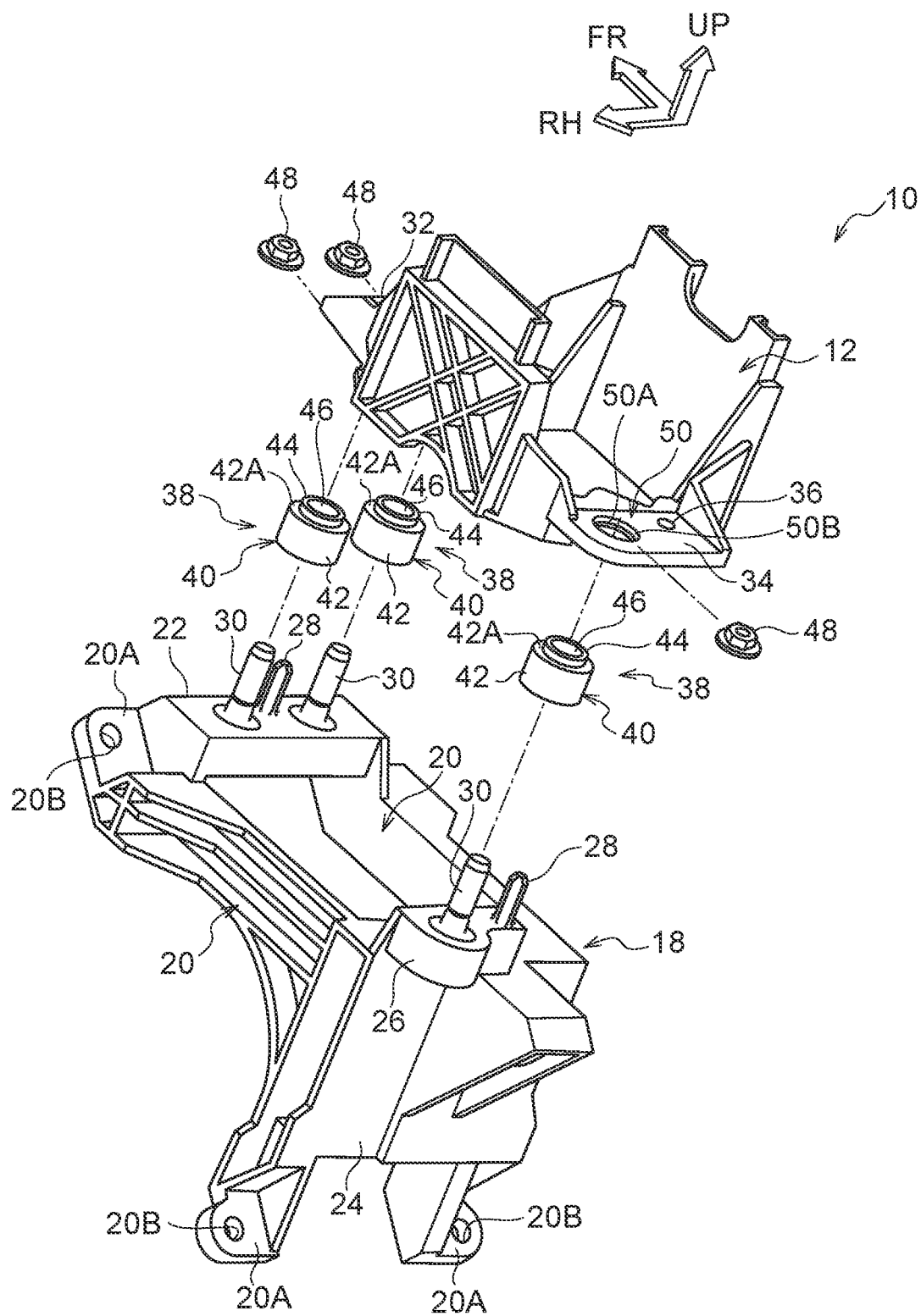
FIG. 2 is a perspective view depicting the principal portions of the shift device.

FIG. 1 depicts principal portions of a shift device 10 according to a first exemplary embodiment in a side view, and FIG. 2 depicts the principal portions of the shift device 10 in a perspective view. In the drawings, the upper side of the shift device 10 is indicated by arrow UP, the front of the shift device 10 is indicated by arrow FR, and the right of the shift device 10 is indicated by arrow RH.

The shift device 10 according to the first exemplary embodiment is a "shift by wire" device. The shift device 10 is disposed at an instrument panel of a vehicle (an automobile), at a vehicle front side of a vehicle width direction inner side of a driver seat (not shown in the drawings) of the vehicle. The front, right and upper sides of the shift device 10 are oriented to, respectively, a diagonal upper-front side, right side and diagonal upper-rear side of the vehicle.

A frame 12 (body) in a substantially cuboid box shape is provided at the shift device 10. The frame 12 is fabricated of resin, serves as a support body, and is disposed inside the instrument panel. A shift lever 14 that serves as a shift body is also provided at the shift device 10. A lever main body 16A that serves as a shift member is provided at the shift lever 14. The lever main body 16A, which is disposed inside the frame 12, is supported at the frame 12 to be rotatable about a base end portion of the lever main body 16A. A knob 16B is provided at an end portion at the opposite side of the lever main body 16A from the side thereof at which the base end portion is provided. The knob 16B protrudes upward from the frame 12 and protrudes into a vehicle cabin from the instrument panel.

Thus, the shift lever 14 is operable by a vehicle occupant of the vehicle (specifically, a driver sitting on the driver seat). A shift position can be altered by the shift lever 14 being operated by rotation (operated by movement) in a shift direction and in a select direction (possibly only in the shift direction).

A support bracket 18 (plate) is disposed at the lower side of the frame 12. The support bracket 18 serves as a vehicle body side member and is fabricated of resin. Leg portions 20 are arranged as pairs in the left-and-right direction at the support bracket 18. The leg portions 20 extend in the front-and-rear direction. The leg portions 20 at a rear side end portion protrude to the lower side. Fixing portions 20A are provided at front end portions and rear end portions (lower end portions) of the respective leg portions 20. Insertion holes 20B are formed penetrating through the fixing portions 20A (see FIG. 2). Bolts are inserted into the respective insertion holes 20B and are threaded into shift device-fixing portions of a vehicle frame. Thus, the support bracket 18 is fixed to the shift device fixing portion of the vehicle frame.

A block-shaped mounting portion 22 spans between the pair of leg portions 20 at the front side. A plate-shaped connection portion 24 spans between the pair of leg portions 20 at the rear side. The mounting portion 22 and connection portion 24 are integrated with the leg portions 20. A block-shaped mounting portion 26 is provided at the connection portion 24. Upper faces of the mounting portions 22 and 26 are substantially coplanar and are oriented upward.

As illustrated in FIG. 2, pins 28 that structure positioning portions and bolts 30 that serve as fastening portions are provided at the mounting portions 22 and 26. The pins 28 and the bolts 30 are formed with axial directions thereof parallel in the vertical direction, and protrude upward from the mounting portions 22 and 26. The pins 28 are formed by being integrally molded with the mounting portions 22 and 26 at substantially central positions between the pairs of leg portions 20. The bolts 30 are disposed, at the mounting portion 22, at both the left and right sides of the pin 28 and, at the mounting portion 26, at the right side of the pin 28. Head portions of the bolts 30 are mounted by being insert-molded in the mounting portions 22 and 26.

Support portions 32 and 34 that are each formed in a plate shape are provided at lower end portions of the frame 12 of the shift device 10. The support portion 32 protrudes to the front side from the frame 12 and opposes the mounting portion 22. The support portion 34 protrudes to the rear side from the frame 12 and opposes the mounting portion 26. The support portions 32 and 34 are formed integrally with the frame 12 by resin molding.

Insertion holes 36 that structure the positioning portions are provided at the support portions 32 and 34. The insertion holes 36 are formed so as to be coaxial with the pins 28 when the frame 12 is disposed on the support bracket 18. By the pins 28 being inserted into the insertion holes 36, the frame 12 is positioned relative to the support bracket 18.

Impact absorption portions 38 are provided between the support portions 32 and 34 of the frame 12 and the mounting portions 22 and 26 of the support bracket 18. The frame 12 is mounted to the support bracket 18 via the impact absorption portions 38. A substantially tubular collar 40 that serves as an intermediate member is provided at each impact absorption portion 38. The collars 40 are fabricated of metal.

A base portion 42 and a small diameter portion 44 that serves as a protruding portion are provided at each collar 40. The base portion 42 is formed in a circular tube shape with a predetermined radius. The small diameter portion 44 is formed with a smaller diameter than the base portion 42. The base portion 42 and small diameter portion 44 are formed to be coaxial. The small diameter portion 44 protrudes upward to a predetermined height from an upper face 42A of the base portion 42. A penetrating hole 46 is provided in an axial center portion of the collar 40. The penetrating hole 46 penetrates through the base portion 42 and the small diameter portion 44. The collars 40 are disposed at the mounting portions 22 and 26 of the support bracket 18 with the bolts 30 inserted into the penetrating holes 46. Distal end portions of the bolts 30 inserted into the penetrating holes 46 protrude upward beyond the penetrating holes 46. The upward protruding bolts 30 are threaded into nuts 48. Thus, the collars 40 are fixed to the mounting portions 22 and 26.

Figure 3A:
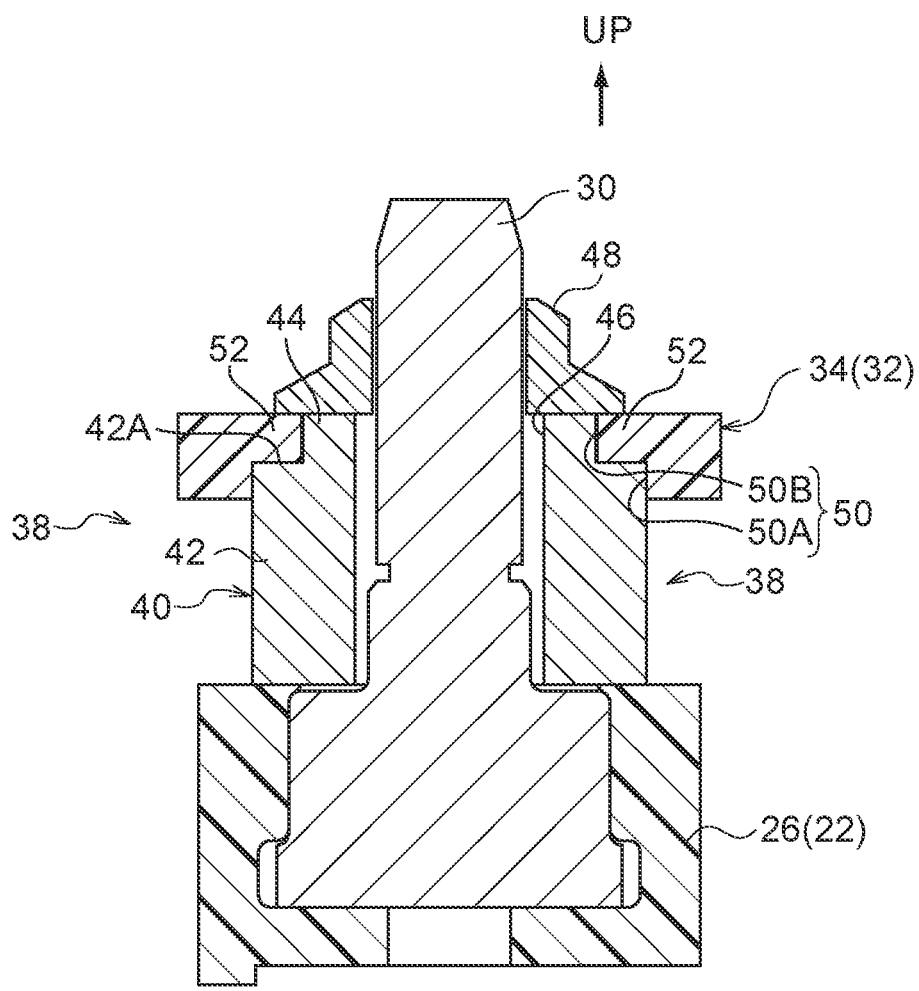
FIG. 3A is a sectional diagram of the principal portions of the shift device, which is a diagram depicting a usual state.

As illustrated in FIG. 2 and FIG. 3A, mounting holes 50 that each serve as an accommodating cavity are provided in the support portions 32 and 34 of the frame 12. Axes of the mounting holes 50 are parallel in the vertical direction. A penetrating portion 50A and a penetrating portion 50B are formed in each mounting hole 50. The penetrating portion 50A has substantially the same diameter as the base portion 42 of the collar 40 and opens out at the lower face side of the support portion 32 or 34. The penetrating portion 50B has substantially the same diameter as the small diameter portion 44 of the collar 40 and opens out at the upper face side of the support portion 32 or 34. The penetrating portion 50A and penetrating portion 50B of the mounting hole 50 are formed to be coaxial.

Each mounting hole 50 is formed such that the depth of the penetrating portion 50B is substantially the same as the height of the small diameter portion 44 of the collar 40, and the depth of the penetrating portion 50A is a depth into which an upper portion of the base portion 42 of the collar 40 can be inserted (pushed in). Thin plate portions 52 are formed at the support portions 32 and 34 by the formation of the mounting holes 50. At each thin plate portion 52, a plate thickness surrounding the penetrating portion 50B is thinner than a plate thickness surrounding the penetrating portion 50A.

In the shift device 10 formed with this structure, the bolts 30 of the support bracket 18 are inserted into the collars 40, and the collars 40 are disposed on the mounting portions 22 and 26. At the frame 12, the pins 28 of the support bracket 18 are inserted into the insertion holes 36 of the support portions 32 and 34, and the collars 40 are tightly fitted into the mounting holes 50. At this time, the small diameter portion 44 of each collar 40 is inserted into the penetrating portion 50B of the mounting hole 50, and the upper portion of the base portion 42 (an upper portion at the side of the base portion 42 at which the small diameter portion 44 is provided) is pushed into the penetrating portion 50A. Thus, outer periphery surfaces of the base portions 42 and inner periphery surfaces of the penetrating portions 50A are engaged by friction force. Upper faces of the small diameter portions 44 of the collars 40 are made substantially coplanar with the upper faces of the support portions 32 and 34, and the bolts 30 protruding from the upper faces of the support portions 32 and 34 are threaded into the nuts 48.

Consequently, the support portions 32 and 34 of the frame 12 are lifted to a predetermined height from the upper faces of the mounting portions 22 and 26 by the collars 40. In addition, movement of the frame 12 in directions intersecting the vertical direction is limited by the base portions 42 of the collars 40 that are tightly fitted into the penetrating portions 50A of the mounting holes 50, and movement of the frame 12 in the vertical direction is limited by the friction force between the outer periphery surfaces of the base portions 42 and the inner periphery surfaces of the penetrating portions 50A.

Figure 3B:
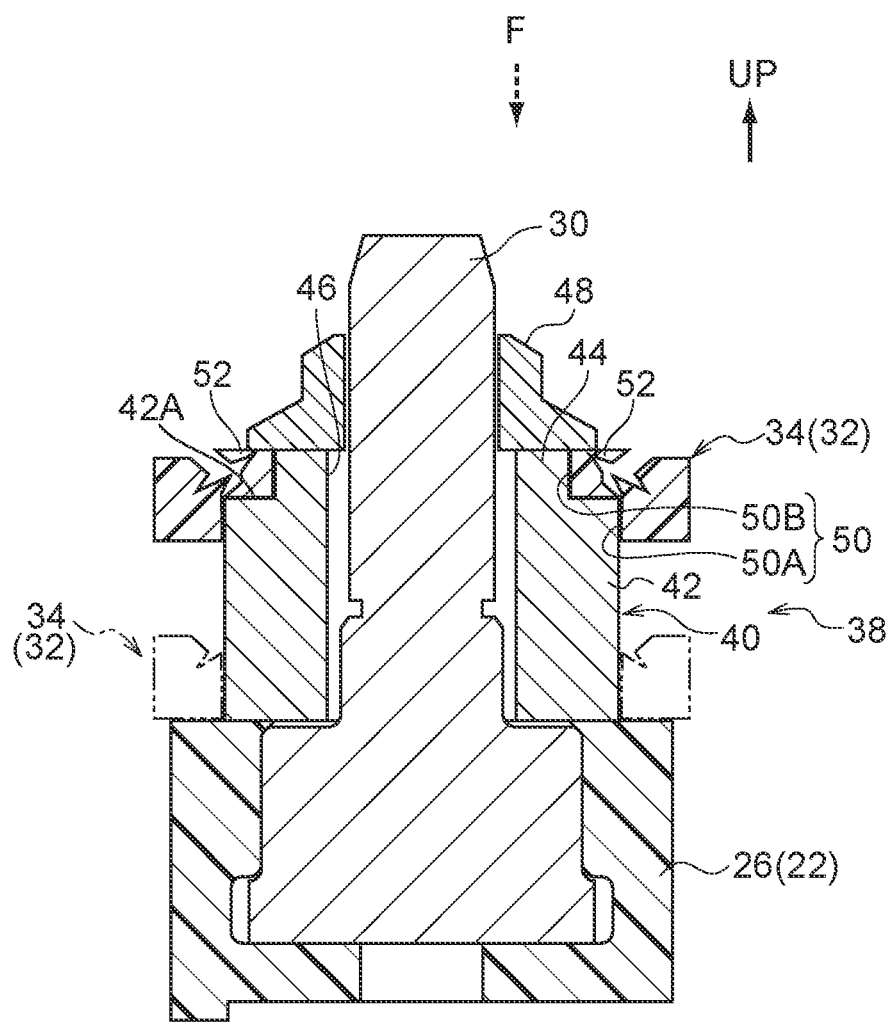
FIG. 3B is a sectional diagram of the principal portions of the shift device, which is a diagram depicting a state in which a load is received.

Hence, if an impact load represented by arrow F is applied from a vehicle occupant (at the upper side) to the shift lever 14 (an instrument panel impact), for example, during a vehicle collision, the impact load is transmitted to the frame 12, and the impact load is received by the upper faces 42A of the base portions 42 of the collars 40. As a result, stresses (shearing stresses) corresponding to the impact load applied to the shift lever 14 are concentrated at peripheral edges of the thin plate portions 52 in the support portions 32 and 34 of the frame 12. Consequently, as illustrated in FIG. 3B, if the impact load applied to the shift lever 14 is at least a predetermined load, breakages occur at the peripheral edges of the thin plate portions 52 of the support portions 32 and 34 and the penetrating portions 50A of the support portions 32 and 34 are moved downward while being guided by the base portions 42 (i.e., the base portions 42 intrude into the penetrating portions 50A), absorbing the impact load. Therefore, an impact load absorption mode by the support portions 32 and 34 and the collars 40 may be made consistent, and an impact load absorption amount may be made consistent.

The thin plate portions 52 of the support portions 32 and 34 surrounding the small diameter portions 44 have thinner plate thicknesses than the support portions 32 and 34 surrounding the base portions 42. Consequently, when the impact load is applied to the shift lever 14, the peripheral edges of the thin plate portions 52 of the support portions 32 and 34 are broken consistently by the peripheral edges of the base portions 42 of the collars 40. Therefore, the impact load absorption mode by the support portions 32 and 34 and the collars 40 may be made consistent effectively, and the impact load absorption amount may be made consistent effectively.

Because the support portions 32 and 34 are separated from the mounting portions 22 and 26 by the collars 40, the support portions 32 and 34 may move downwards. Thus, a stroke length of the support portions 32 and 34 retreating (backing off or moving downward) when the shift lever 14 receives the impact load is assured. Therefore, the support portions 32 and 34 may break at the thin plate portions 52 and, after the thin plate portions 52 start to break, the support portions 32 and 34 are moved downward by the impact load applied to the shift lever 14 in opposition to the friction force between the outer periphery surfaces of the base portions 42 and the inner periphery surfaces of the penetrating portions 50A. Accordingly, the frame 12 and the shift lever 14 descend and the impact load may be absorbed between the support portions 32 and 34 and the collars 40. Therefore, the impact absorption portions 38 may cause the frame 12 to retreat together with the shift lever 14 while absorbing the impact load applied to the shift lever 14.

The load that is absorbed at the impact absorption portions 38 by the thin plate portions 52 breaking may be easily adjusted by adjusting one or both of thicknesses and diameters of the thin plate portions 52. Furthermore, the load that breaks the thin plate portions 52 may be adjusted by adjusting the friction force between the outer periphery surfaces of the base portions 42 and the inner periphery surfaces of the penetrating portions 50A. Therefore, an absorption amount of the impact load applied to the shift lever 14 at the impact absorption portions 38 may be adjusted easily. Moreover, because the base portions 42 of the collars 40 guide movement of the support portions 32 and 34 when the support portions 32 and 34 are moving downward, tilting of the frame 12 and the shift lever 14 while retreating may be suppressed.

Second Exemplary Embodiment

Now, a second exemplary embodiment is described. In the second exemplary embodiment, structures that are the same as in the first exemplary embodiment are assigned the same reference symbols as in the first exemplary embodiment and are not described in detail.

FIG. 4 depicts structures of an impact absorption portion 54 according to the second exemplary embodiment in a perspective view seen diagonally from above. In the second exemplary embodiment, collars 40A that serve as the intermediate member are used in place of the collars 40, and support portions 56 are formed at the support body (the frame 12) in place of the support portions 32 and 34.

At each collar 40A, knurling 58 that serves as a friction portion is formed at an outer periphery surface 42B of the base portion 42. The knurling 58 is formed so as to produce a predetermined friction force against the inner periphery surface of the penetrating portion 50A when the base portion 42 is pushed into the penetrating portion 50A of the mounting hole 50.

Plural grooves 60 that serve as a breakage facilitating portion are provided at the support portion 56, encircling the opening of the penetrating portion 50B. The grooves 60 are formed in circular arc shapes with an inner diameter similar to the inner diameter of the penetrating portion 50A (and the base portion 42) and are each formed in a slit shape with a bottom. The plural grooves 60 are coaxial with the penetrating portion 50A and are formed at a predetermined spacing in the circumferential direction of the penetrating portion 50B.

Therefore, when an impact load is applied to the shift lever 14, stress at each support portion 56 concentrates at the peripheral edge of the thin plate portion 52 of the support portion 56. When the impact load applied to the shift lever 14 is at least a predetermined load, breakage of the support portions 56 occurs at the thin plate portions 52, in the regions of the grooves 60 that are weakened relative to their surroundings. Thus, the impact load may be absorbed. Breakage positions of the thin plate portions 52 at this time may be specified by the grooves 60 being formed in the support portions 56. As a result, variation of the impact load absorption amount due to variation of the breakage positions of the thin plate portions 52 may be suppressed. Furthermore, the load that causes breakage of the thin plate portions 52 may be easily adjusted by adjusting the depths, widths, spacing and lengths of the grooves 60. By adjusting both the thickness of the thin plate portions 52 and the depths, widths, spacing and lengths of the grooves 60, the load that causes breakage of the thin plate portions 52 may be even further easily adjusted.

The breakage facilitating portion is not limited to the grooves 60 that are formed intermittently. The breakage facilitating portion may be a groove formed in a ring shape. Alternatively, the breakage facilitating portion may be pinholes that are formed at a predetermined spacing in the circumferential direction of the penetrating portion 50B and have bottoms or penetrate between the upper face of the support portion 56 and a floor face of the penetrating portion 50A (a face at the side thereof at which the penetrating portion 50B is formed).

Because friction force is produced between the outer periphery surface 42B of each base portion 42 and the inner periphery surface of the penetrating portion 50A by the knurling 58, the impact load may be absorbed when the support portion 56 that has broken at the thin plate portion 52 moves downward. The friction force between the outer periphery surface 42B of the base portion 42 and the inner periphery surface of the penetrating portion 50A may be adjusted by adjusting the roughness (knurl spacing) and depth of the knurling 58. Therefore, the impact load absorption amount may be adjusted easily.

In the second exemplary embodiment, the knurling 58 is formed at the outer periphery surface 42B of each base portion 42, but this is not limiting. Knurling may be formed at the inner periphery surface of the penetrating portion 50A. Further, although the knurling 58 is provided to serve as the friction portion in the second exemplary embodiment, this is not limiting. The surface of the outer periphery surface 42B of the base portion 42 may be roughened by forming random surface irregularities or the like. In this case, the friction force may be adjusted, and the impact load absorption amount may be adjusted, by adjusting the surface roughness (heights and density of the surface irregularities).

An expanding diameter portion (inclined portion) may be provided to serve as the friction portion at the base portion of the intermediate member. The expanding diameter portion may be formed such that an outer diameter thereof steadily increases away from the protruding portion. Consequently, the expanding diameter portion provides resistance against movement of the support portion, and the impact load may be absorbed by the support portion moving in opposition to this resistance. In this situation, the impact load absorption amount may be adjusted easily by adjusting the size and shape of the expanding diameter portion.

Third Exemplary Embodiment

Now, a third exemplary embodiment is described. In the third exemplary embodiment, structures that are the same as in the first exemplary embodiment are assigned the same reference symbols as in the first exemplary embodiment and are not described in detail.

In the first and second exemplary embodiments, the support portions 32, 34 and 56 are provided at the frame 12 at the upper side of the base portions 42 of the collars 40 and 40A that serve as the intermediate member, and the mounting holes 50 that serve as the accommodating cavity are formed in the support portions 32, 34 and 56. However, the support portions may be provided at the lower side of the intermediate members (support bodies), and the accommodating cavities provided in the support portions. In the third exemplary embodiment, provision of the accommodating cavities in support portions at the lower side of the intermediate members is described. FIG. 5 depicts principal portions of an impact absorption portion 62 according to the third exemplary embodiment in a sectional diagram.

A flat plate-shaped mounting portion 64 and a substantially flat plate-shaped support plate 66 that serves as the support portion are provided at each impact absorption portion 62. The mounting portion 64 is disposed at the upper side and the support plate 66 opposes the mounting portion 64. The mounting portion 64 is formed integrally with the frame 12 in place of the support portion 32, 34 or 56, and the support plate 66 is formed integrally with the support bracket 18 (the support body) in place of the mounting portion 22 or 26.

A bolt 30A that serves as the fastening portion is provided at the support plate 66 by insert-molding. A head portion of the bolt 30A is disposed at the lower side of the support plate 66 (the opposite side of the support plate 66 from the side thereof at which the mounting portion 64 is disposed). An insertion hole 64A is formed in the mounting portion 64. The bolt 30A is inserted into the insertion hole 64A.

A substantially circular tube-shaped collar 68 that serves as the intermediate member is disposed between the mounting portion 64 and the support plate 66. A penetrating hole 68A is formed penetrating through an axial center portion of the collar 68. An outer diameter of the collar 68 is larger than an outer diameter of the head portion of the bolt 30A. A mounting cavity 70 that serves as the accommodating cavity is formed in the support plate 66. An inner diameter of the mounting cavity 70 is substantially the same as the outer diameter of the collar 68. A thin plate portion 72 is formed in the support plate 66 between the lower face of the support plate 66 and a floor face of the mounting cavity 70.

The bolt 30A is inserted into the penetrating hole 68A of the collar 68, a lower portion of the collar 68 is tightly fitted in the mounting cavity 70, and the collar 68 is disposed on the support plate 66. The bolt 30A inserted through the insertion hole 64A of the mounting portion 64 is threaded into the nut 48. Thus, the collar 68 is fixed between the mounting portion 64 and the support plate 66, and the mounting portion 64 (the frame 12) is supported at the support plate 66 (the support bracket 18) via the collar 68.

Accordingly, when an impact load is applied to the shift lever 14, stress is concentrated at the peripheral edges of the thin plate portions 72 of the support plates 66. When the impact load applied to the shift lever 14 is at least a predetermined load, breakage at each thin plate portion 72 is caused by the peripheral edge of the collar 68, and the collar 68 moves downward while being guided by an inner periphery surface of the mounting cavity 70 of the support plate 66. Thus, the impact load is absorbed. Therefore, an impact load absorption mode by the support plate 66 and collar 68 may be made consistent, and the impact load absorption amount may be made consistent.

The thin plate portion 52 at the floor portion side of the mounting cavity 70 is thinner than the surroundings of the mounting cavity 70. Therefore, when an impact load is applied to the shift lever 14, the peripheral edge of the thin plate portion 72 of each support plate 66 is broken consistently by the peripheral edge of the collar 68. Therefore, the impact load absorption mode by the support plate 66 and collar 68 may be made consistent effectively, and the impact load absorption amount may be made consistent effectively.

Because the mounting portion 64 and support plate 66 are separated by the collar 68, after the thin plate portion 72 starts to break, the mounting portion 64 is moved downward together with the collar 68 by the impact load applied to the shift lever 14 in opposition to friction force between the outer periphery surface of the collar 68 and the inner periphery surface of the mounting cavity 70. As a result, the frame 12 and the shift lever 14 may descend and the impact load may be absorbed between the support plate 66 and the collar 68. Therefore, the impact absorption portions 62 may cause the frame 12 to retreat together with the shift lever 14 while absorbing the impact load applied to the shift lever 14.

At each impact absorption portion 62, the load that is absorbed by the thin plate portion 72 breaking may be easily adjusted by adjusting one or both of thickness and diameter of the thin plate portion 52 (the outer diameter of the collar 68). Furthermore, the load that breaks the thin plate portions 72 may be adjusted by adjusting the friction force between the outer periphery surfaces of the collars 68 and the inner periphery surfaces of the mounting cavities 70. Therefore, an absorption amount of the impact load applied to the shift lever 14 at the impact absorption portions 62 may be adjusted easily.

In the first and second exemplary embodiments, the small diameter portion 44 and the upper portion of the base portion 42 of each collar 40 or 40A serving as the intermediate member are formed so as to be accommodated (tightly fitted) in the mounting hole 50 serving as the accommodating cavity. In the third exemplary embodiment, the lower portion of the collar 68 serving as the intermediate member is formed so as to be accommodated (tightly fitted) in the mounting cavity 70 serving as the accommodating cavity. However, the collar 40 or 40A may be insert-molded in the support portion 32, 34 or 56, and the collar 68 may be insert-molded in the support plate 66.

The first to third exemplary embodiments have been described using the collars 40, 40A and 68 with substantially circular tube shapes as the intermediate members. However, the shape of each intermediate member is not limited to a substantially circular tube shape but may be a polygonal substantial rod shape.

In the first to third exemplary embodiments described above, examples are described in which the shift device 10 is provided at an instrument panel of a vehicle. However, the shift device may be provided at the floor of a vehicle, or may be provided at a steering column. The shift device may be equipped with a rotating body that is rotated to serve as the shift body and that changes the shift position.

The disclosures of Japanese Patent Application No. 2016-251698 filed Dec. 26, 2016 are incorporated into the present specification by reference in their entirety.

The invention claimed is:

1. A shift device comprising:
   a shift body that is movably supported at a support body, the shift body shifting a shift position upon being moved;
   a support portion provided at the support body and having an accommodating cavity that is open in the support portion; and
   an intermediate member having a step portion at an upper side, the intermediate member being accommodated at the accommodating cavity, the support portion being disposed at the step portion of the intermediate member, and when an impact load is applied to the support body from the step portion, the shift body and the support body are moved relative to the intermediate member to absorb the impact load, the support portion being broken by the step portion of the intermediate member, the intermediate member intruding into the accommodating cavity, and the impact load being absorbed,
   wherein:
   the intermediate member is formed in a circular tube shape;
   the step portion of the intermediate member is a small diameter portion of an outer diameter of the circular tube shape;
   the accommodating cavity is a through hole corresponding to the outer diameter of the circular tube shape of the intermediate member; and
   the intermediate member is accommodated in a through direction of the accommodating cavity when accommodated in the accommodating cavity.

2. The shift device according to claim 1, further comprising a friction portion that increases friction force between an outer periphery surface of the intermediate member and an inner periphery surface of the accommodating cavity.

3. The shift device according to claim 2, wherein the friction portion is knurling.

4. The shift device according to claim 1, wherein the support portion includes a breakage facilitating portion provided along a peripheral edge of the intermediate member.

5. The shift device according to claim 4, wherein the breakage facilitating portion is a groove.

6. The shift device according to claim 4, wherein the breakage facilitating portion is a plurality of grooves, and the grooves are formed at a predetermined spacing.

7. The shift device according to claim 1, wherein the accommodating cavity is a recess within the support portion, the accommodating cavity having an axis that is parallel to a vertical direction.

8. The shift device according to claim 1, wherein the accommodating cavity is a recess within the support portion, the accommodating cavity having an axis that is parallel to a direction of movement of the shift body and support body.

9. A shift device comprising:
- a shift body that is movably supported at a support body, the shift body shifting a shift position upon being moved;
- a support portion provided at the support body, at which an accommodating cavity is provided, the accommodating cavity being opened in the support portion;
- an intermediate member having a step portion at an upper side and accommodated at the accommodating cavity, the support portion being disposed at the step portion of the intermediate member; and
- a thin plate portion formed at the support portion, the thin plate portion being provided at one side of the intermediate member, and the thin plate portion of the support portion being thinner in thickness than the support portion at surroundings of the intermediate member,
- wherein when an impact load is applied to the support body from the step portion, the shift body and the support body are moved relative to the intermediate member to absorb the impact load, the thin plate portion of the support portion being broken by the step portion of the intermediate member, the intermediate member intruding into the accommodating cavity, and the impact load being absorbed, wherein:
- the intermediate member is formed in a circular tube shape;
- the step portion of the intermediate member is a small diameter portion of an outer diameter of the circular tube shape;
- the accommodating cavity is a through hole corresponding to the outer diameter of the circular tube shape of the intermediate member; and
- the intermediate member is accommodated in a through direction of the accommodating cavity when accommodated in the accommodating cavity.

10. A shift device comprising:
- a shift body that is movably supported at a support body, the shift body shifting a shift position upon being moved;
- support portions provided at the support body, an accommodating cavity being opened in each of the support portions;
- a plurality of intermediate members respectively accommodated at the accommodating cavities, the support portions being disposed at one side of the intermediate members, and when an impact load is applied to the support body from the one side, the shift body and the support body are moved relative to the intermediate members to absorb the impact load, the support portions being broken by peripheral edges of the intermediate members, the intermediate members intruding into the accommodating cavities, and the impact load being absorbed; and
- a plurality of bolts provided at a mounting portion which is provided at a vehicle side, to which the support body is mounted, the support body being fixed to the vehicle by the bolts, wherein the intermediate members are respectively provided around the bolts, and wherein:
- the intermediate member is formed in a circular tube shape;
- the step portion of the intermediate member is a small diameter portion of an outer diameter of the circular tube shape;
- the accommodating cavity is a through hole corresponding to the outer diameter of the circular tube shape of the intermediate member; and
- the intermediate member is accommodated in a through direction of the accommodating cavity when accommodated in the accommodating cavity.

11. A shift device comprising:
- a shift body that is movably supported at a support body, the shift body shifting a shift position upon being moved;
- a support portion provided at the support body and having an accommodating cavity; and
- an intermediate member having a step portion at an upper side, the intermediate member being accommodated at the accommodating cavity, the support portion being disposed at the step portion of the intermediate member, and when an impact load is applied to the support body from the step portion, the shift body and the support body are moved relative to the intermediate member to absorb the impact load, the support portion being broken by the step portion of the intermediate member, the intermediate member intruding into the accommodating cavity, and the impact load being absorbed, wherein a thin plate portion is formed at the support portion, and a lower face of the thin plate portion opposes an upper face of the step portion of the intermediate member, and wherein:
the intermediate member is formed in a circular tube shape, and the step portion of the intermediate member is a small diameter portion of an outer diameter of the circular tube shape.

* * * * *